UNITED STATES PATENT OFFICE.

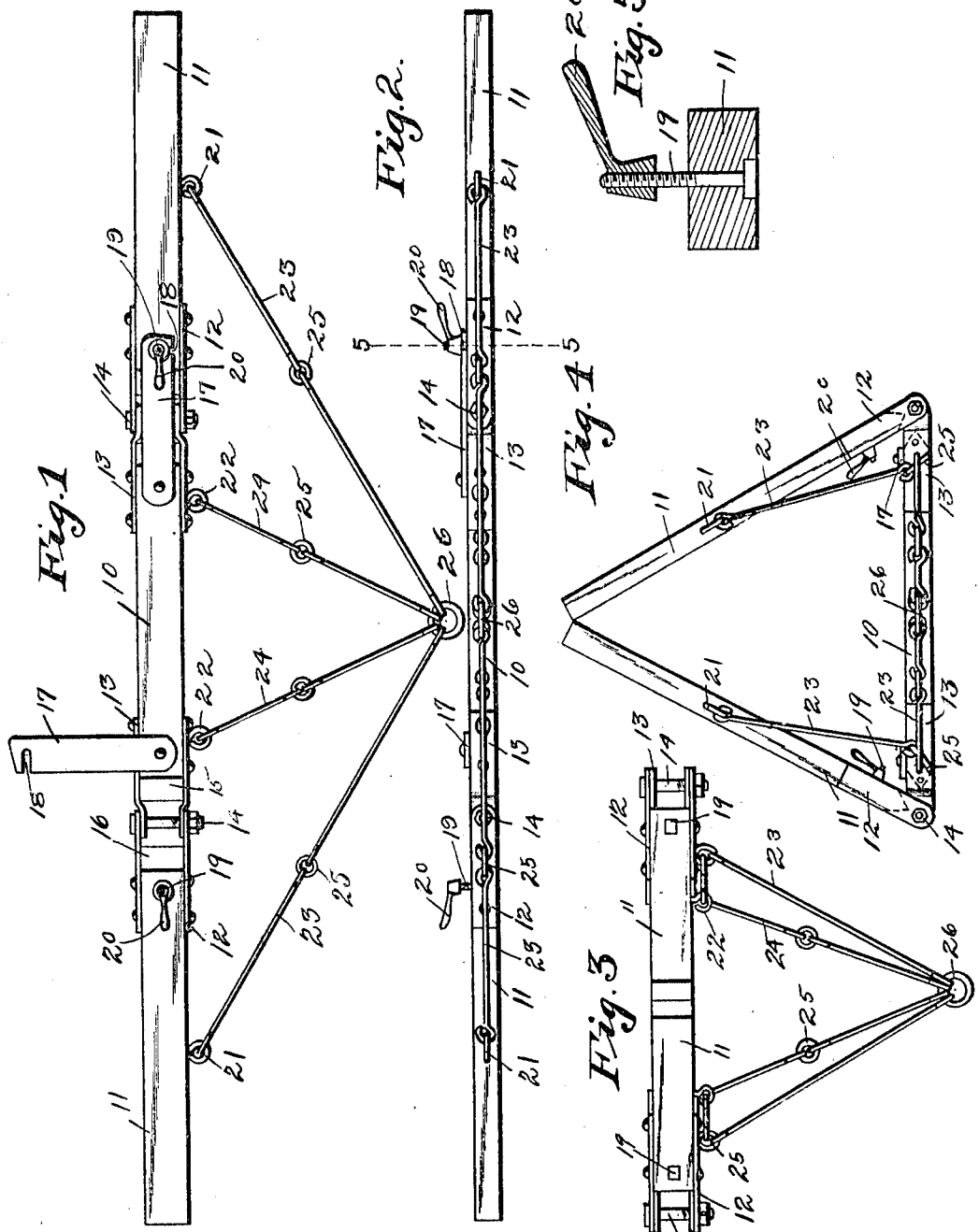

FRANCIS F. ADIX, OF BOONE, IOWA.

DRAW-BAR FOR HARROWS.

950,421.  Specification of Letters Patent.  Patented Feb. 22, 1910.

Application filed August 26, 1909. Serial No. 514,772.

*To all whom it may concern:*

Be it known that I, FRANCIS F. ADIX, a citizen of the United States, residing at Boone, in the county of Boone and State of Iowa, have invented a certain new and useful Draw-Bar for Harrows, of which the following is a specification.

The object of my invention is to provide a draw bar for harrows or other implements, of simple, durable, and inexpensive construction, so designed as to be easily drawn through the common form of wagon gate.

A further object is to provide a folding draw bar for harrows or other implements, arranged with clamps designed to fix rigidly the pivoted sections.

A further object is to provide a draw bar for harrows or other implements, with draw rods arranged to pull evenly on all the sections of the bar when in an extended position, and on the central draw bar section only when in a folded position.

My invention consists in the construction, arrangement, and combination of the various parts of the device, whereby the objects contemplated are attained, as hereinafter more fully set forth, pointed out in my claims, and illustrated in the accompanying drawings, in which—

Figure 1 shows a plan view of the draw bar extended. Fig. 2 shows a side elevation of same. Fig. 3 shows a plan view of the draw bar folded. Fig. 4 shows a side view of same. Fig. 5 shows a detail sectional view taken on the line 5—5 of Fig. 2.

Referring to the accompanying drawings, the central section of the draw bar is indicated by the reference numeral 10. The two end sections 11 are pivotally connected to said section 10 by hinges comprising the inwardly extended pieces 12 fixed to the sections 11, the outwardly extended pieces 13 fixed to the section 10, and the bolt 14 pivotally connecting said pieces 12 and 13. The ends 15 and 16 of the sections 10 and 11 are beveled as shown in Fig. 1 and in dotted lines in Fig. 4.

The clamps 17 are pivotally connected to the central section 10 at one end, and are arranged with notches 18 at the other end to engage the bolts 19. The hand screws 20 firmly secure the clamps 17 relative to the end sections 11, such arrangement rigidly securing the end sections 11 to the central section 10.

The eye bolts 22 and 21 are fixed to the central and end draw bar sections and receive the draw rods 24 and 23, each of which comprises two sections connected by rings 25, said draw rods 23 and 24 engaging the ring 26.

In the operation of the draw bar, when used in connection with a three section harrow, the clamps 17 are swung into engagement with the bolts 19, and the hand screws 20 are tightened down to keep the end sections 11 of the draw bar in an extended position relative to the central section 10. The harrow sections are then fixed to their respective draw bar sections. The clamps 17 prevent the end sections of the draw bar 11 or the end sections of the harrow from tilting upwardly as power is applied to the draw rods 23 and 24. If it is desired to pass through a gate, the hand screws 20 are loosened and the clamps 17 are swung from engagement with the bolts 19. Both the end sections of the draw bar and the harrow are then folded into positions as shown in Figs. 3 and 4. The draw bar and harrow in this form may then easily pass through a gate or door. The draw rods 24 on the central section 10 receive at this time all the power applied, the draw rods 23 being freely suspended in position as shown in Figs. 3 and 4.

I claim as my invention:

1. A draw bar, comprising a central section, end sections pivoted to said central section, plates pivoted at one end to one section and overlapping another section, and means for clamping the free ends of the plates to said section for securing the sections in alinement.

2. A draw bar, comprising a central section, end sections pivoted to said central draw bar section, draw rods broken and connected by rings, extending from a main draw ring to the central and end draw bar sections, and notched clamps pivoted to the central draw bar section, bolts in the end draw bar sections to receive said notches in said clamps, and hand screws for securing the free ends of said clamps to the end draw bar sections.

3. A draw bar, comprising a central section, beveled at each end, end sections beveled at one end, pieces fixed to the central section extending outwardly, pieces fixed to one end of each end section extended inwardly, bolts pivotally connecting said outwardly and inwardly extended pieces on the central and end sections, notched clamps pivotally connected to the central draw bar section, bolts in the end sections to receive said notches in said clamps, hand screws for securing the free ends of said clamps to the end draw bar sections, and draw rods broken and connected by rings extending from a main draw ring to the central and end draw bar sections.

Des Moines, Iowa, July 10, 1909.

FRANCIS F. ADIX.

Witnesses:
C. O. HANSON,
L. ADA REED.